3,546,479
LONG PERIOD ELECTRONIC TIMER FOR AEROSOL DISPENSER OR THE LIKE
Robert S. Lundin, Thomaston, Klaus Wallentowitz, Waterbury, and Edward T. Bosman, Middlebury, Conn., assignors to General Time Corporation, Stamford, Conn., a corporation of Delaware
Filed Feb. 9, 1968, Ser. No. 704,485
Int. Cl. H01h 47/18, 51/34; H02p 1/04
U.S. Cl. 307—132                                                11 Claims

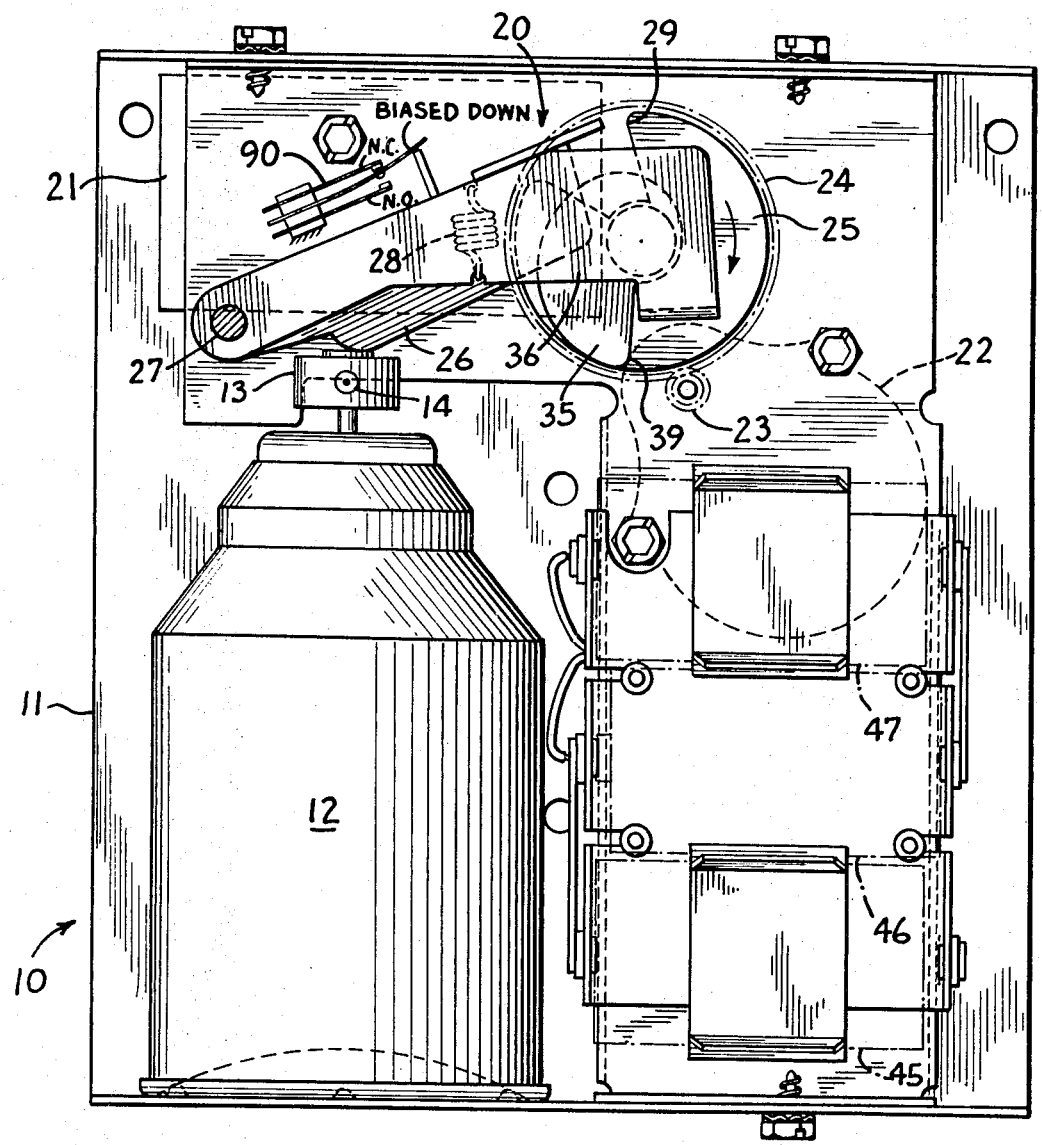

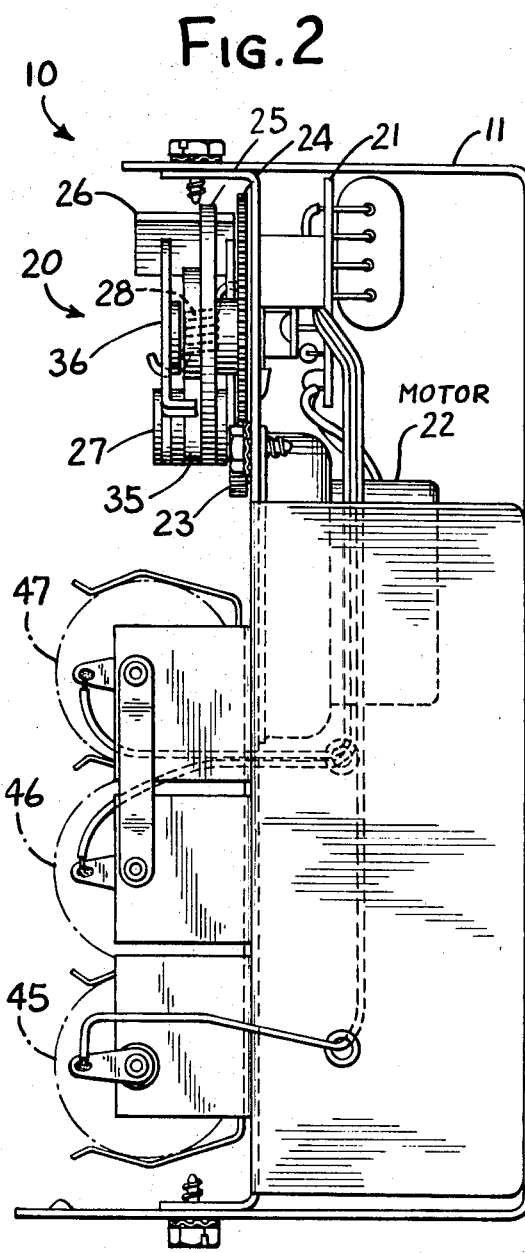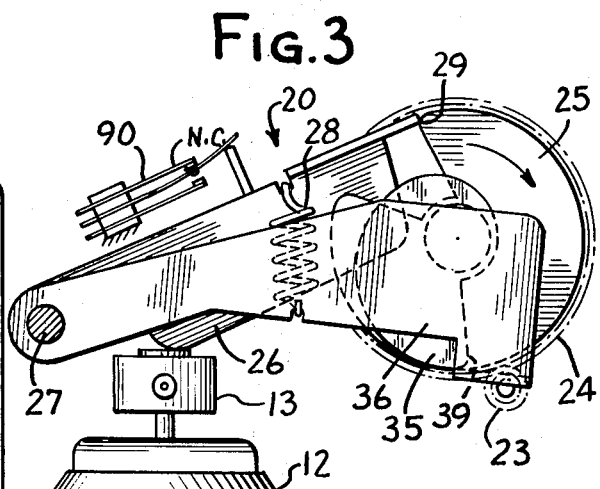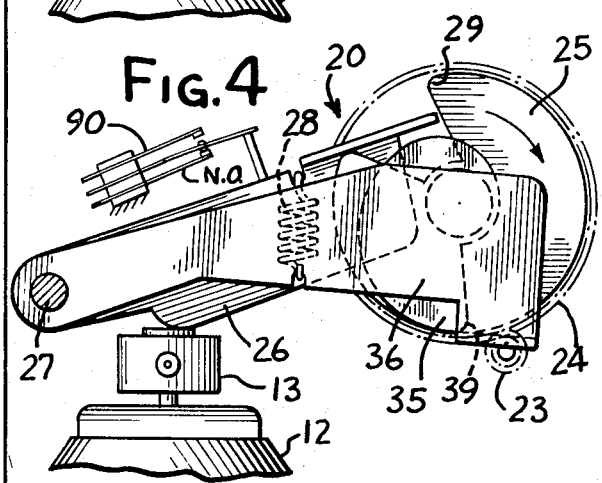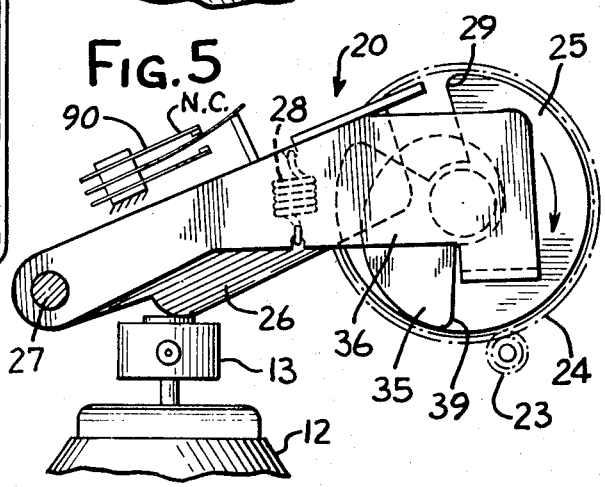

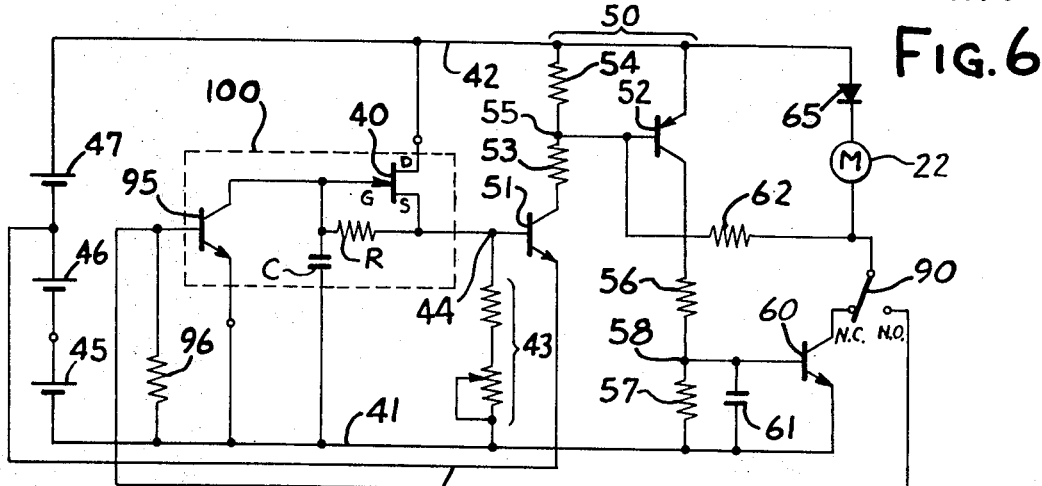
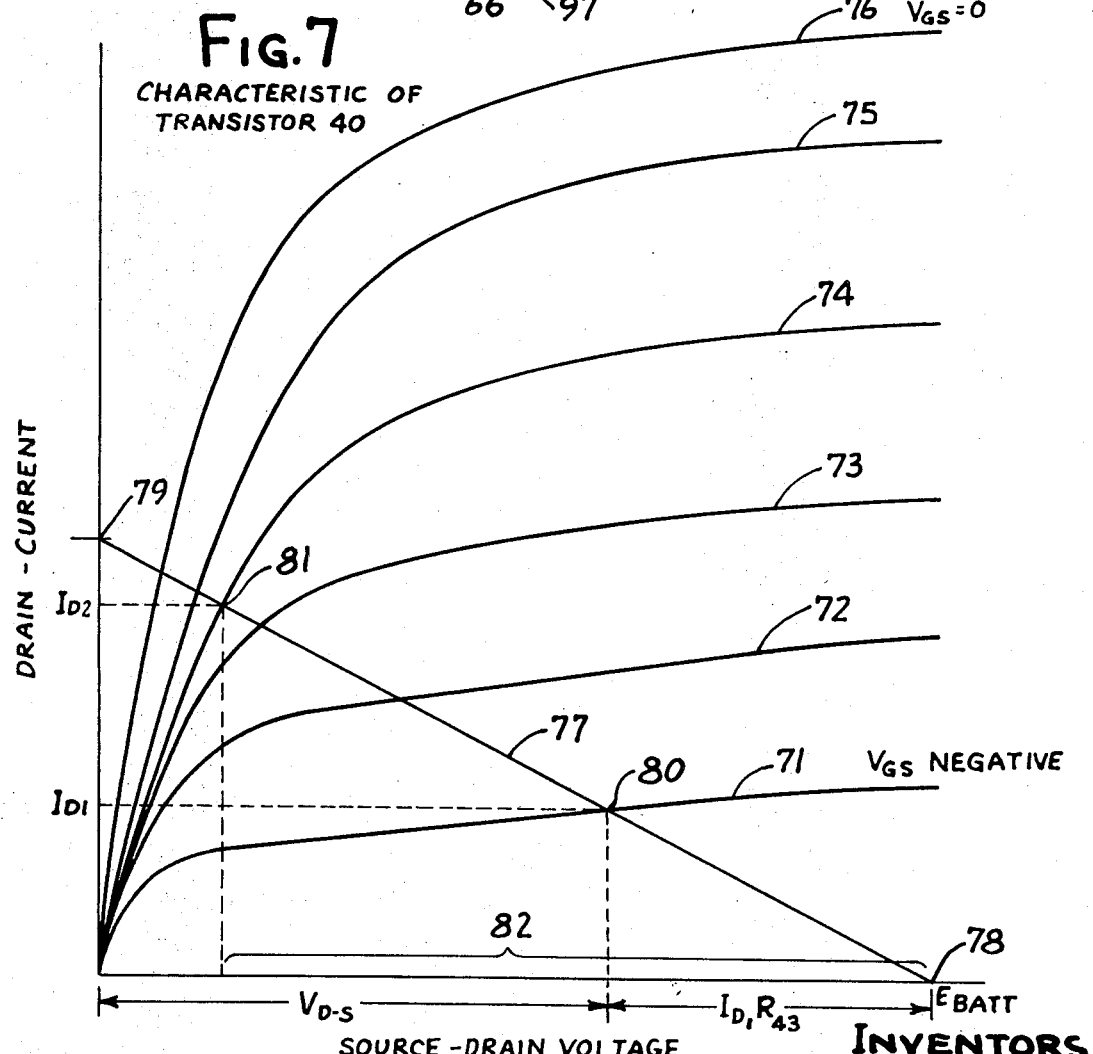
Fig. 7 CHARACTERISTIC OF TRANSISTOR 40
INVENTORS
ROBERT S. LUNDIN
KLAUS WALLENTOWITZ
EDWARD T. BOSMAN United States Patent Office 3,546,479
Patented Dec. 8, 1970

ABSTRACT OF THE DISCLOSURE

A timing arrangement for periodic actuation of an aerosol dispenser or the like at relatively long intervals which includes a field effect transistor having a high impedance resistance-capacitance (RC) circuit at its input connected for charging by a load resistor at its output with means for responding to the output voltage to signal the end of the timed interval and to discharge the capacitor for initiation of a new timing cycle. A motor is actuated at the end of timed interval for re-cocking the triggering means and for releasing a measured "shot" of aerosol, following which the motor turns itself off in readiness for the ensuing cycle.

DESCRIPTION OF THE INVENTION

While RC circuits are widely used to achieve a timed delay it has been difficult to secure delay intervals on the order of 1200 seconds or longer without resorting to extermely high values of capacitance with attendant bulk and expense. To keep the size within reasonable bounds electrolytic capacitors have been used. However, electrolytic capacitors have a relatively high leakage current which may approach the magnitude of the charging current. Moreover the amount of leakage current is not entirely predictable and may reach extremely high levels after a period of non-use, greatly lengthening the time interval or resulting in complete failure of the triggering action.

It is a general object to provide a long period electronic timer capable of portable operation free of the regular A.C. supply lines, which is highly accurate and more consistent than conventional timers, which is largely immune to temperature change, and which is inexpensive and compact. It is a related object of the invention to provide a timer which operates at low voltage and draws only a small amount of current to give long battery life but which produces sufficient power for positive actuation of an aerosol dispensing valve or the like.

It is another object of the present invention to provide a long period timer which achieves a long interval but which nevertheless uses only a small capacitor of the type having a plastic film dielectric and characterized by inherently low leakage. It is another object to provide a long period timer which utilizes the peculiar characteristics of a field effect transistor in combination with a high impedance RC circuit at the input and low impedance output circuit at the output for energizing subsequent low impedance stages and with the output circuit providing a variable source of energizing voltage for the RC circuit to greatly increase the effective time constant of the latter. It is more specifically an object of the present invention to provide a circuit of this type employing a field effect transistor in which the voltage applied to the RC circuit starts out at an extremely low level and increases progressively at a low rate thereby to avoid the rapid exponential build-up of charge in the capacitor during the early portion of the timed interval which characterizes conventional RC timing circuits. In this connection it is an object to provide a long period timer in which the capacitor voltage builds up as a near-linear function of time and in which the output voltage also increases approximately linearly with sufficient slope, even at the end of a long timed interval, to insure precise and well defined triggering. This is to be contrasted with timers having an output which varies exponentially with progressively reduced slope and in which the point of triggering is largely indeterminant.

Other objects and advantages of the invention will be apparent upon reading the attached detailed description and upon reference to the drawings in which:

FIG. 1 shows an automatic aerosol dispenser utilizing the present invention with the motor drive mechanism in its initial condition;

FIG. 2 is a side view of the device shown in FIG. 1;

FIG. 3 is a stop motion view of the mechanism of FIG. 1 with the first cam follower arm shown on point of drop-off;

FIG. 4 is a stop motion view showing the mechanism just following the drop-off, with the valve depressed;

FIG. 5 is a similar view showing the condition just following drop-off at the second cam with the valve released;

FIG. 6 is a schematic diagram showing the improved long period timing circuitry for operating the drive motor.

FIG. 7 is a set of characteristic curves.

While the invention has been described in connection with a preferred embodiment, it will be understood that we do not intend to be limited to the particular embodiment shown but intend to cover the various alternative and equivalent designs and uses of the present invention included within the spirit and scope of the appended claims.

Turning now to FIG. 1 there is shown an automatic aerosol dispenser 10 having a housing 11 which includes a well known type of aerosol can 12 having a valve plunger 13 and nozzle 14. Mounted above the aerosol can is an actuating mechanism 20 having timing and control circuitry supported on an adjacent circuit board 21. The mechanism 20 includes a drive motor 22 of the low voltage D.C. type having built-in gear reduction terminating in a pinion 23. The pinion 23 meshes with a main drive gear 24 having a cam 25. The latter cooperates with a cam follower arm 26 which is mounted upon a shaft 27 and which has an associated spring 28. Cross reference is made to the Mahon Pat. 3,214,062.

In FIG. 1 the cam 25 is shown in its normal or at rest position. Upon rotation of the motor 22 at the end of the timed interval, the cam 25 rotates to a position, shown in FIG. 3, in which the arm 26 reaches a point of drop-off 29 permitting the arm to be pulled downwardly by the spring 28 to depress the valve of the aerosol can.

For the purpose of stretching or cocking the spring and to cut short the valve actuation, a second cam 35 is provided, coupled to the first, and cooperating with a second cam follower arm 36 which is also mounted on the shaft 27 and which has a point of drop-off 39. The lower end of the spring is anchored to the arm 36, and the cam 35 has a semi-cardioid shape so that the spring 28 is gradually tensioned as the cam shaft rotates. The cams are phased so that the two arms 26, 36 drop-off in quick succession, the first serving to depress the valve as shown in FIG. 4 and the second serving to release the spring and thereby release the valve as shown in FIG. 5 to provide a discharge time which may, in a practical case, be less than one second's duration.

Attention will next be given to the electronic circuitry used for actuating the drive motor at relatively long but accurately timed and consistent intervals as set forth in FIG. 6. In accordance with the present invention a field effect transistor is used having a high impedance resistance capacitance, or RC, circuit connected to its input and having a low impedance output circuit which is used to energize the RC circuit so that the RC circuit receives voltage from the latter beginning at a low value and progressively increasing to effect a voltage increase in the capacitor which is nearly linear as contrasted with the exponential build-up which usually characterizes RC timing circuits. Thus, as shown in the drawing, a field effect transistor 40 is used having gate, drain, and source electrodes which have been labeled G, D and S, respectively, the gate electrode forming an input circuit characterized by high impedance and the drain and source electrodes forming a part of the output circuit of relatively low impedance. Connected across the input circuit from the gate electrode to the ground or return bus 41 is a timing capacitor C having an associated timing resistor R. The drain electrode is, in the present instance, directly connected to the positive or supply bus 42. The circuit from the source electrode is completed through a load resistor 43 to the ground bus 41. Battery cells 45, 46, 47 are connected in series, as shown, between the ground bus 41 and the supply bus 42. The load resistor 43 is preferably made up of a fixed portion and a manually variable portion connected in series. For energizing the RC circuit from the output or load circuit of the field effect transistor, the upper end of the resistor R is coupled to the point of connection 44 of the load resistor and the source electrode.

In carrying out the present invention means are provided for turning on the drive motor 22 when the voltage at the load resistor (output terminal 44) reaches a predetermined value corresponding to the accumulation of a predetermined charge on the capacitor C. The triggering means, or voltage sensitive detector, is in the form of a high gain transistor amplifier 50 including a first transistor 51 and a second transistor 52 connected in complementary symmetry. The first transistor has load resistors 53, 54 with a midterminal 55, while the second transistor has load resistors 56, 57 and a midterminal 58. The latter load resistors are coupled to the base terminal of an output transistor 60, the output circuit of which is connected in the ground return of the drive motor 22. A capacitor 61, connected across the input circuit of the transistor 60, tends to stabilize the voltage on the base of the transistor, making the transistor largely immune to transient impulses. In order to insure that the transistors 52, 60 remain turned on, or saturated, after the iniating impulse is received from the transistor 51, a positive feedback connection is provided in the form of a resistor 62 connected from the motor in the output circuit of the transistor 60 to the base or input circuit of the transistor 52. A diode 65, faced as shown, is connected in the motor circuit in order to prevent the back EMF of the motor, particularly under conditions of coasting, from affecting the input circuit of the transistor 52. In order to set the level at which the transistor 51 conducts, the emitter terminal of the transistor is connected to a source of biasing or reference voltage via a line 66 which is connected to the junction between battery cells 46 and 47. This may be considered the coarse adjustment of the firing point. Fine adjustment of the time of response is settable by manual adjustment of the load resistor 43 in the output circuit of the field effect transistor.

In operation, it will be assumed that the capacitor C is initially empty of charge. Under the initial, quiescent condition a very small load current flows through the load resistor 43 carrying only a small voltage drop therein so that the voltage which exists at terminal 44 is only slightly above ground potential. This low voltage causes charge to flow through the resistor R. Such resistor preferably has a high impedance on the order of 100 megohms, and this, combined with the initially low voltage at terminal 44, causes charge to accumulate in the capacitor C at an extremely low rate, resulting in an increase in the voltage across the capacitor. The initial slow build-up of charge, and hence voltage, is to be contrasted with conventional RC circuits in which the voltage across the capacitor rises exponentially at an initially high rate. Because of the slow rate of charge build-up on the capacitor, the time interval is lengthened over that which can be conventionally obtained, resulting in effective multiplication of the normal RC time constant.

Upon increase in the voltage across the capacitor C applied to the gate electrode, additional current flows through the transistor output circuit causing an increased drop in the output resistor 43 and an increase in the voltage at 44 which is applied to the timing resistor R. Such increased voltage tends to continue a build-up of charge in the capacitor C which further increases the voltage at the gate electrode. The effect is to produce a capacitor voltage which increases substantially linearly with time and to produce an output voltage at terminal 44 in the low impedance output circuit which also increases approximately linearly, maintaining an appreciable slope until the end of the timed interval when the voltage rises to a level sufficient to trigger the transistor 51 into conduction.

When the transistor 51 conducts, the voltage drop which occurs in the load resistor 54 causes a drop in voltage at the gate terminal 55 of the transistor 52, turning such transistor on. This produces flow of current in the transistor load circuit causing an increase in voltage at the terminal 58 which is connected to the gate of transistor 60, thus turning on the transistor 60 and energizing the motor 22 which is connected in its output circuit. In order to insure that the transistors 52, 60 both remain turned on, the resistor 62 provides positive feedback to the gate terminal of the transistor 52. Conduction in the output circuit of transistor 60 causes the right hand end of the feedback resistor 62 to go to nearly ground potential, which potential, applied to the gate of the transistor 52, insures that it remains in current saturation. This in turn insures that the voltage at terminal 58 applied to the input circuit of the transistor 60 will remain sufficiently high to maintain that transistor in its fully conducting or saturated condition. The output transistor 60 is preferably chosen to provide a low emitter-collector junction potential so that substantially all of the battery voltage is available at the motor 22 in the output circuit.

By reason of the circuit just described utilizing a field effect transistor, delay intervals on the order of 900 to 120 seconds may be readily achieved using a timing capacitor of the plastic film type having a capacitance as low as 5 $\mu f$. Not only does this result in a highly compact timer but the lack of leakage in a capacitor of the plastic film type insures a high degree of timing accuracy and consistency from one cycle to the next.

In order to understand the operation of the circuit in greater detail and to fully appreciate the unique contribution of the field effect transistor as an element in this circuitry, reference is made to FIG. 7 which shows a family of characteristics of drain current plotted as a function of source-drain voltage. The respective curves 71–76 are plotted for successive values of gate-source voltage from negative 1.5 volts to zero in substantially equal increments. These curves are crossed by a load line 77 which has an intersection with the horizontal axis at point 78 corresponding to the total battery voltage and which has an intersection 79 with the vertical axis at a point corresponding to the current obtained by dividing the battery voltage by the resistance of the load resistor 43. Under the initial condition, with the capacitor C free of charge and with a quiescent value of current flowing in the load resistor, the voltage at the gate will be approximately —1.5 volts with respect to the voltage at the source. Thus the intersection of the curve 71, corresponding to this value of voltage. with the load line 77 provides an initial operating point 80 at which the voltage from gate to source, $Vgs$, is equal to the IR drop in the load resistor.

As the capacitor C accumulates charge the point of initial equilibrium is disturbed and the effective voltage $V_{gs}$ is the difference between the voltage drop in the load resistor and the voltage across the capacitor. This causes the operating point to shift along the load line to the left, progressively, until an operating point 81 is reached in which the voltage drop across the load resistor is at a magnitude 82 sufficient to cause conduction to occur in the transistor 51. This, as previously noted, turns on motor 22 which operates the cam follower arm 26 to depress the valve plunger on the aerosol container.

In accordance with one of the aspects of the present invention, the motor and its associated operating linkage are provided with normally open and normally closed cycling contacts for turning the motor driven mechanism off at the end of a single cam cycle and for simultaneously restoring the timing capacitor C to its discharged condition in readiness for another operating cycle. To this end contacts N.C. and N.O. are provided on a single-pole, double-throw switch 90 (see also FIG. 1). The contact arrangement is such that the N.C. contact is closed under normal conditions. At all times the actuator arm 26 is riding upon the periphery of the cam 25, while the N.O. contact is closed in response to the brief condition of drop-off of the arm 26 from the point of drop-off 29. The N.C. contact is interposed in the motor circuit between the motor and the output transistor 60.

In carrying out the present invention a discharging transistor is provided of the silicon, low-leakage type, having an output circuit which is connected across the timing capacitor C and having an input circuit under control of contact N.O. so that, upon drop-off of the operating arm to actuate the aerosol dispenser, the discharging transistor is turned on to restore the capacitor to its discharged state, with the input circuit of the transistor serving as an alternate return connection for the motor so that the motor continues to rotate until it has completed its cycle at which time the cycling switch 90 is returned to its original N.C. state. Thus, referring to the drawing, the discharging transistor 95 is provided having an output circuit shunted across the capacitor C and having an input circuit which includes a biasing resistor 96 to make the transistor normally non-conducting connected by a control line 97 to the contact N.O.

With respect to the operation of this portion of the circuit, the contact N.C. is closed with the mechanism in its initial state shown in FIG. 1. Rotation of the motor continues until the point of drop-off is reached illustrated in FIG. 3. At drop-off, shown in FIG. 4, the switch 90 is switched to its alternate or N.O. condition. Completion of the circuit from the motor through contacts N.O. and via the line 97 to the input terminal of the transistor 95 causes the voltage at the input terminal to swing positive turning on the transistor to produce immediate discharge of the charge accumulated on the capacitor C. Simultaneously the motor circuit is completed through the base-emitter junction of the transistor 95 so that the motor continues to turn, causing drop-off of the arm 36 from the cam 35 shutting off the flow from the aerosol container and the restoration of the control arm 26 to the upraised condition shown in FIG. 5 breaking the contact N.O. and restoring the contact N.C. However, due to discharge of the capacitor all of the transistors 51, 52 and 60 have been restored to their off condition so that the motor remains off in readiness for an ensuing cycle. With the shunt removed from the capacitor C, the capacitor begins, again, to charge, thereby timing out a completely new cycle. The effect is to produce discharge of a measured amount of aerosol into the air at a repetitive, accurately timed interval which may be on the order of 15 to 20 minutes.

Because of the freedom from dependence upon the regular A-C supply line, timed dispensers of the present type may be located wherever desired without limitation and serviced by insertion of a new dispensing can at regular intervals. Since the discharge intervals are precisely timed and since a measured amount of material is dispensed, the servicing dates are accurately predeterminable so that a large number of units in the field may be serviced regularly and efficiently without waste of aerosol solution and without gaps in the dispensing service provided by each of the units.

In order to further increase the accuracy of the timed interval and to make such interval as independent as possible of the environmental conditions, certain of the circuit components may be encapsulated in epoxy resin or the like as indicated by the dotted outline 100 in FIG. 6.

Since such a low value of capacitance may be employed, notwithstanding the long period, and since the remaining components are inherently small, the entire circuit may be mounted upon a printed circuit board of extremely small dimension. The current drain between successive actuations, totalling less than one milliampere, insures a long battery life. Because the cocking spring 28 is progressively stretched over a substantially complete cycle of rotation of the cam shaft, the peak drain upon the batteries during the time that the motor is running is kept at a low level, yet the sudden release of energy from the spring 28 insures that the energy is released at a high rate to develop force which is entirely adequate to depress the valve provided on conventional types of aerosol dispensers.

While specific circuit constants will be readily ascertainable to satisfy a given set of requirements with the above teachings in mind, the following identification of circuit elements found useful in a practical case are set forth for the convenience and understanding of those wishing to practice the present invention:

Motor 22—Permanently magnetic field Mabuchi Model FM 18350
Transistor 40—MPF 103
Resistor R—100 megohms
Capacitor C—5 µf., Mylar film type
Resistor 43—1500 ohms series with 10,000 ohm rheostat
Transistor 51—2N3565
Transistor T3—2N4248
Resistor 53—220 ohms
Resistor 54—1000 ohms
Resistor 56—100 ohms
Resistor 57—1000 ohms
Transistor 60—2N3568
Capacitor 61—0.1 mfd.
Resistor 62—2200 ohms
Diode 65—G100A
Battery 45, 46, 47—1.5 volt nominal per cell
Transistor 95—2N3565
Resistor 96—100 ohms Moreover, while the invention has been described in connection with the problem of dispensing aerosol liquid at widely separated, but accurately defined, time intervals, it will be apparent that the invention in certain of its aspects is not limited to such application but is applicable wherever it is desired to have an electronic, battery operated timer capable of accurately establishing relatively long time intervals. Thus the term "load device" shall, in addition to the motor 22, be understood to refer to any device which is to be periodically actuated. The terms "low value" as applied to the timing capacitor and "high value" as applied to the timing resistor denote values which produce an RC network having an impedance on the same order as the impedance which characterizes the input circuit of field effect transistors, for example, transistors of the type MPF103, and in which the resistance is of an order of magnitude of approximately 100 megohms and the capacitance is on the order of, say, one to one hundred µf. depending upon the voltage of the source, the stability and sensitivity of the triggering detector and the length of the time interval which is desired. The term "field effect transistor" as used herein shall be understood to include solid state devices characterized by an input circuit having an impedance greatly in excess of that in the output circuit, particularly devices having an input impedance which is even greater than that achieved in field effect transistors currently available.

We claim:

1. In a long period electronic timer the combination comprising a field effect transistor having a high impedance input circuit and a relatively low impedance output circuit, a high impedance RC circuit including a low value timing capacitor and a high value timing resistor, said timing capacitor being connected in the input circuit, a load resistor in the output circuit in parallel with said timing capacitor and said timing resistor and the output circuit and the load resistor having a source of direct supply voltage, said timing resistor being connected to the capacitor and coupled to the load resistor so that the RC circuit receives voltage from the latter beignning at a low value and progressively increasing upon build-up of charge in said capacitor caused by the transistor progressively passing more current through the transistor and the load resistor as a result of increasing voltag on the capacitor, a load device, a triggering detector circuit interposed between the load resistor and the load device for actuating the load device upon achievement of predetermined voltage in said load resistor caused by the increase in current through the transistor and the load resistor caused by the increasing charge in said capacitor and means responsive to said load device a predetermined interval after actuation thereof for discharging the capacitor and initiating an ensuing timing cycle, said load resistor being adjustable for varying the time of triggering of the triggering circuit.

2. In a long period electronic timer the combination comprising a field effect transistor having a high impedance input circuit and a relatively low impedance output circuit, a high impedance RC circuit including a low value timing capacitor and a high value timing resistor, said timing capacitor being connected in the input circuit, a load resistor in the output circuit in parallel with said timing capacitor and said timing resistor and the output circuit and the load resistor having a source of direct supply voltage, said timing resistor being connected to the capacitor and coupled to the load resistor so that the RC circuit receives voltage from the latter which varies depending upon the charge in said capacitor caused by the transistor progressively passing a changing current through the transistor and the load resistor as a result of changing voltage on the capacitor, a load device, a triggering detector circuit interposed between the load resistor and the load device for actuating the load device upon achievement of a predetermined voltage in said load resistor caused by the change in current through the transistor and the load resistor caused by the changing charge in said capacitor, and means responsive to the load device for conditioning the capacitor for initiation of an ensuing timing cycle.

3. In a long period electronic timer, the combination comprising a field effect transistor having an input circuit and an output circuit, and RC circuit including a timing resistor and a timing capacitor, said timing capacitor being connected in the input circuit, a load resistor in the output circuit in parallel with said timing capacitor and said timing resistor and the output circuit and the load resistor having a source of direct supply voltage, said timing resistor being connected to the capacitor and coupled to the load resistor so that the RC circuit receives voltage from the latter beginning at a low value and progressively increasing upon build-up of charge in said capacitor caused by the transistor progressively passing more current through the transistor and the load resistor as a result of increasing voltage on the capacitor, a load device, means responsive to achieving a predetermined voltage in said load resistor caused by the increase in current through the transistor and the load resistor caused by the increasing charge in said capacitor for actuating said load device and means responsive to said load device a predetermined interval after actuation thereof for discharging the capacitor and initiating an ensuing timing cycle.

4. In a long period electronic timer the combination comprising a field effect transistor having a high impedance input circuit and a relatively low impedance output circuit, a high impedance RC circuit including a low value timing capacitor and a high value timing resistor, said timing capacitor being connected in the input circuit, a load resistor in the output circuit in parallel with said timing capacitor and said timing resistor and the output circuit and the load resistor having a source of direct supply voltage, said timing resistor being connected to the capacitor and coupled to the load resistor so that the RC circuit receive voltage from the latter beginning at a low value and progressively increasing upon build-up of charge in said capacitor caused by the transistor progressively passing more current through the transistor and the load resistor as a result of increasing voltage on the capacitor, a load device, a triggering detector circuit interposed between the load resistor and the load device for actuating the load device upon achievement of a predetermined voltage in said load resistor caused by the increase in current through the transistor and the load resistor caused by the increasing charge in said capacitor, means responsive to said load device a predetermined interval after actuation thereof for discharging the capacitor and initiating an ensuing timing cycle, and means associated with the output circuit for varying the effective point of triggering of the detector circuit relative to the charge on the capacitor.

5. In a long period electronic timer the combination comprising a field effect transistor having a high impedance input circuit and a relatively low impedance output circuit, a high impedance RC circuit including a low value timing capacitor and a high value timing resistor, said timing capacitor being connected in the input circuit, a load resistor in the output circuit in parallel with said timing capacitor and said timing resistor and the output circuit and the load resistor having a source of direct supply voltage, said timing resistor being connected to the capacitor and coupled to the load resistor so that the RC circuit receives voltage from the latter beginning at a low value and progressively increasing upon build-up of charge in said capacitor caused by the transistor progressively passing more current through the transistor and the load resistor as a result of increasing voltage on the capacitor, a load device, a triggering detector circuit interposed between the load resistor and the load device for actuating the load device upon achievement of a predetermined voltage in said load resistor caused by the increase in current through the transistor and the load resistor caused by the increasing charge in said capacitor, and means including a transistor shunting said timing capacitor and turned on incident to operation of the load device for discharging the capacitor for initiation of an ensuing timing cycle, and means for varying the time of triggering of the detector circuit relative to the charge on the capacitor.

6. In a long period electronic timer the combination comprising a field effect transistor having a high impedance input circuit including a gate and a low impedance output circuit including drain and source electrodes, a high impedance RC circuit including a low value timing capacitor and a high value timing resistor, said timing capacitor being connected across the input circuit, a load resistor in series with source electrode and in parallel with the timing capacitor and said timing resistor a source of direct voltage connected to the drain electrode and to the load resistor, said timing resistor being connected between the source electrode and the gate electrode so that the capacitor is charged as a result of the voltage which exists across the load resistor beginning at a low value and progressively increasing upon increase of the voltage applied by the capacitor to the gate electrode caused by the transistor progressively passing more current through the transistor and the load resistor as a result of increasing voltage on the capacitor resulting in a near-linear increase, with time, of the voltage across the load resistor, a load device, a triggering detector circuit interposed between the load resistor of the field effect transistor and the load device for energizing the load device upon achievement of a predetermined voltage in the load resistor caused by the increase in current through the transistor and the load resistor caused by the increasing charge in said capacitor, and means responsive to the operation of the load device for discharging the capacitor in readiness for the initiation of an ensuing timing cycle.

7. In a long period electronic timer, the combination comprising a field effect transistor having a high impedance input circuit and a low impedance output circuit, a high impedance RC circuit including a low value timing capacitor and a high value timing resistor, said timing capacitor being connected across the input circuit, a load resistor in the output circuit in parallel with said timing capacitor and said timing resistor and the output circuit and the load resistor having a source of supply voltage, said timing resistor being connected to the capacitor and coupled to the load resistor so that the RC circuit receives voltage from the latter beginning at a low value and progressively increasing upon build-up of charge in said capacitor caused by the transistor progressively passing more current through the transistor and the load resistor as a result of increasing voltage on the capacitor, a single-cycling load device, a capacitor discharging transistor having an input circuit and an output circuit shunting said capacitor, and means responsive to achieving a predetermined voltage in said load resistor caused by the increase in current through the transistor and the load resistor caused by the increasing charge in said capacitor for energizing said load device and for rendering said discharging transistor conductive during the time the load device is energized to discharge and maintain said capacitor discharged until the load device completes its cycle.

8. The combination as claimed in claim 7 in which the load device is in the form of a motor having a cycling switch, said cycling switch being part of the means for rendering the transistor conductive during said capacitor discharge as long as the motor current flows.

9. The combination as claimed in claim 8 in which the cycling switch is in the form of a SPDT switch having a normally closed contact for normally conducting the motor current and a normally open contact at least briefly coupled to the input circuit of the discharging transistor for turning on the discharging transistor followed by re-establishing of the normally closed contact at the end of the motor cycle.

10. In a long period electronic timer the combination comprising a field effect transistor having a high impedance input circuit and a low impedance output circuit, a high impedance RC circuit including a low value timing capacitor and a high value timing resistor, said timing capacitor being connected across the input circuit, a load resistor in the output circuit in parallel with said timing capacitor and said timing resistor and the output circuit and the load resistor having a source of direct supply voltage, said timing resistor being connected to the capacitor and coupled to the load resistor so that the RC circuit receives voltage from the latter beginning at a low value and progressively increasing upon build-up of charge in said capacitor caused by the transistor progressively passing more current through the transistor and the load resistor as a result of increasing voltage on the capacitor, a transistor amplifier having an input circuit and an output circuit so constructed and arranged as to conduct upon achieving of a predetermined voltage in said load resistor caused by the increase in current through the transistor and the load resistor caused by the increasing charge in said capacitor, an output circuit including a load device coupled to the transistor amplifier, a positive feedback connection from the output circuit to the amplifier for insuring that the latter is sustained in a conducting condition.

11. In a long period electronic timer, the combination comprising a field effect transistor having a high impedance input circuit and low impedance output circuit, a high impedance RC circuit including a low value timing capacitor and high value timing resistor, said timing capacitor being connected across the input circuit, a load resistor in the output circuit in parallel with said timing capacitor and said timing resistor and the output circuit and the load resistor having a voltage supply in the form of a battery, said timing resistor being connected to the capacitor and coupled to the load resistor so that the RC circuit receives voltage from the latter beginning at a low value and progressively increasing upon build-up of charge in said capacitor caused by the transistor progressively passing more current through the transistor and the load resistor as a result of increasing voltage on the capacitor, an amplifier including a triggering transistor having its input connected for response to the voltage in the load resistor, said transistor being connected to an intermediate point on said battery for supplying to the transistor a predetermined reference voltage at low impedance for determining the point at which conduction occurs, and a load device connected to the amplifier for actuation in response to such conduction.

References Cited

UNITED STATES PATENTS

| | | | |
|---|---|---|---|
| 3,392,352 | 7/1968 | White | 331—111 |
| 3,074,028 | 1/1963 | Mammano | 331—111 |
| 2,404,001 | 7/1946 | Smith | 318—444X |

J D MILLER, Primary Examiner

C. L. YATES, Assistant Examiner

U.S. Cl. X.R.

307—141.4; 318—443, 484; 317—142